March 21, 1961  C. P. LINDLEY  2,975,915
DISPENSING CONTAINER FOR POWDERED MATERIALS
Filed Feb. 17, 1958  3 Sheets-Sheet 1

INVENTOR.
CURTIS P. LINDLEY
BY
Smith & Tuck

March 21, 1961 C. P. LINDLEY 2,975,915
DISPENSING CONTAINER FOR POWDERED MATERIALS
Filed Feb. 17, 1958 3 Sheets-Sheet 2
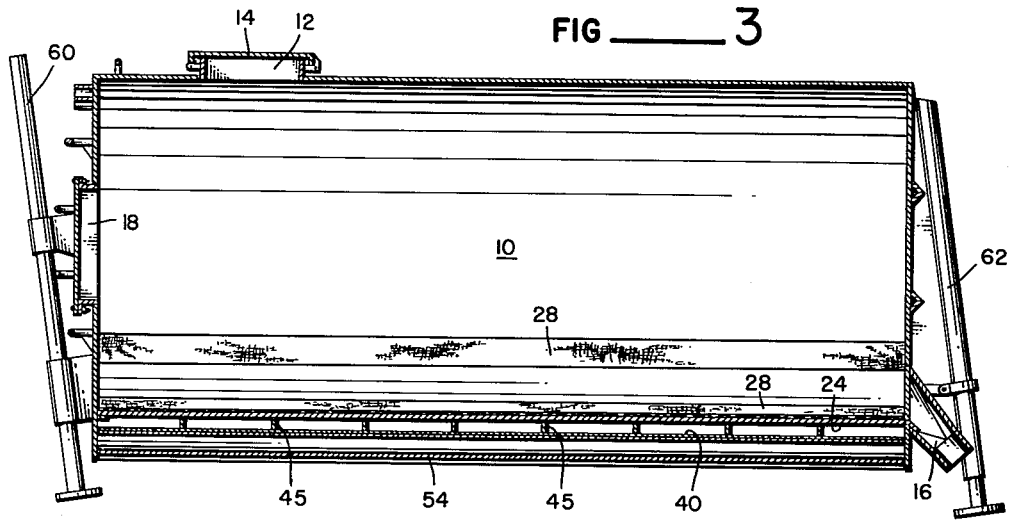
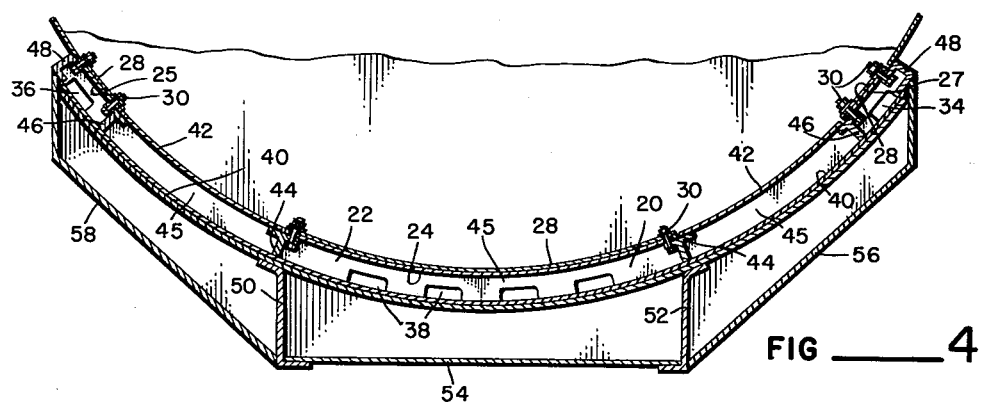
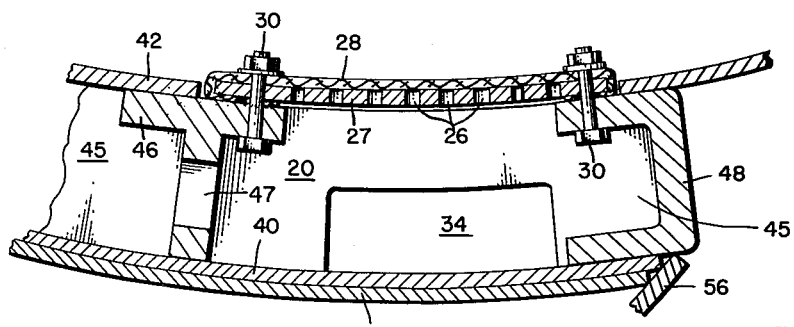
INVENTOR.
CURTIS P. LINDLEY
BY
Smith & Tuck March 21, 1961  C. P. LINDLEY  2,975,915
DISPENSING CONTAINER FOR POWDERED MATERIALS
Filed Feb. 17, 1958  3 Sheets-Sheet 3
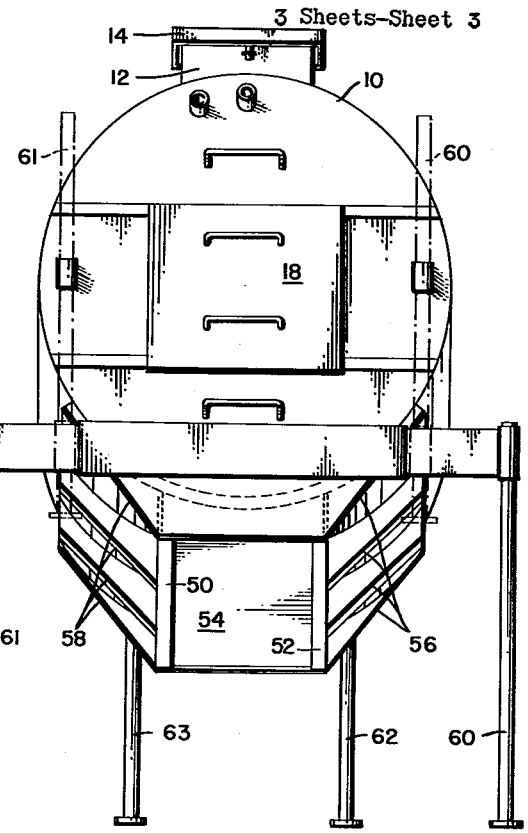
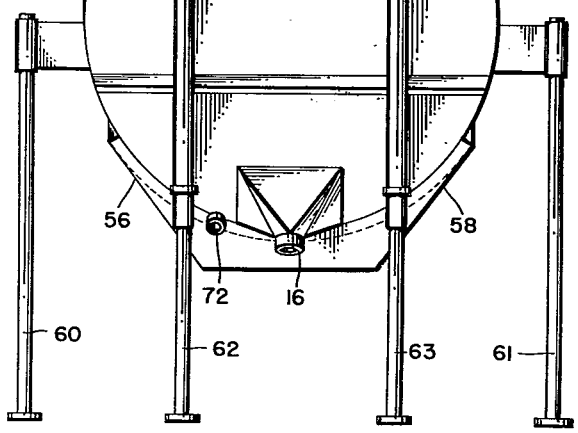
INVENTOR.
CURTIS P. LINDLEY
BY
*Smith & Tuck*

United States Patent Office 2,975,915
Patented Mar. 21, 1961

2,975,915

DISPENSING CONTAINER FOR POWDERED MATERIALS

Curtis P. Lindley, Bellevue, Wash., assignor to Centennial Mills, Inc., Portland, Oreg., a corporation of Washington Filed Feb. 17, 1958, Ser. No. 715,755

4 Claims. (Cl. 214—83.28)

This present invention relates to the general class of inventions dealing with containers for the housing of bulk, powdered materials such as flour made from grains and various other finely divided materials such as are used in the making of plastic materials, paint bases, glues and the like. More particularly, this invention has as its main purpose the bulk handling of powdered materials from the plant of the manufacturer, through the transportation stage, to the plant of the processor and finally to provide a bulk storage unit for the convenience of the processor who will use the material from the storage container until it has been exhausted and then it will be supplanted with another fully loaded unit.

Competition requires that a processor, in almost any line, combine the basic materials common to its field and produce a finished article ready for resale to distributors or to the wholesale trade for ultimate use of persons buying at retail. In the past there has been considerable economic waste in the handling of certain powdered materials, for instance a miller might take grain and process it and finally produce flour. The flour, thus normally produced would be sacked in various types of appropriate sacks for convenient handling in shipment and storage. When the processor obtained the powdered materials, or flour, it would be necessary to open the sacks and dump their contents into the processing machinery and the sacks became a waste item. In many instances, however, the excess labor involved in the handling of the sack materials was considerably greater than the actual cost of the sacks and when taken together, these two items added very appreciably to the cost of the bulk materials to the processor.

In this present invention, it is believed, means are provided for the economical storage in bulk; the transportation to a point of use and then the storage of the material, still in bulk, until it is actually drawn into processing machinery for use. By having a transportable bulk container, from which materials can be easily discharged, many of the various other former steps which added so much to the cost of handling the goods can be entirely eliminated. Flour, for instance, as an example, can be kept under ideal conditions, and further, protected from the elements and from all forms of contaminations.

The principal object of this invention, therefore, is to provide an easily transported dispensing container for bulk powdered materials and flours so that a very minimum of handling occurs and thus the goods can be delivered at a minimum cost.

A further object of this present invention is to provide a dispensing container for bulk handling of flours and the like which is provided with special means for dispensing or discharging the bulk goods from the transportation and storage container.

A further object of this invention is to provide a dispensing container for flours and the like that insures a high degree of cleanliness and which protects the goods from various forms of contamination so often experienced if the same goods are handled in sacked form.

Further objects, advantages and capabilities will be apparent from the description and disclosure in the drawings, or may be comprehended or are inherent in the device.

In the drawings:

Figure 3 is a typical longitudinal sectional view, in elevation, through the container, the view being similar to Figure 2, but shown on an enlarged scale to better illustrate certain important features of construction.

Figure 4 is a vertical cross-sectional view illustrating the air distributing means in greater detail.

Figure 5 is a fragmentary vertical, cross-sectional view through the bottom portion of a container, of a form which may be used with this present invention.

Figure 6 is a front end elevation of the dispensing container after it is removed from the transporting truck.

Figure 7 is a rear end elevation of the container of Figure 6.

Figure 1:
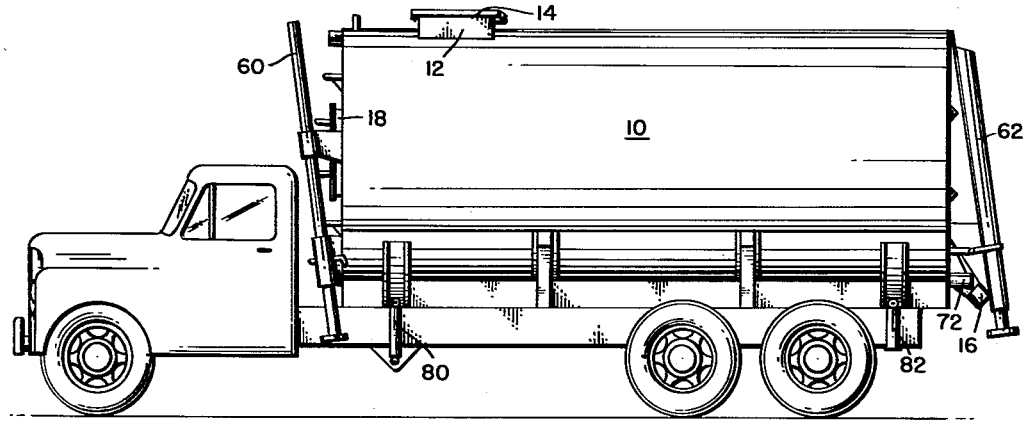
Figure 1 is a side elevation of the dispensing container made after the teachings of this present invention and showing the same as applied to a motor truck for transportation to a point of delivery.

In the drawings, throughout which like reference numerals indicate like parts, the numeral 10 designates one form of container which may be considered as an example of how this plan is put into operation. Throughout the drawings, a cylindrical form of tank 10 has been illustrated and this has been shown in a substantially horizontal position. It is believed that it will be apparent, however, that a tank embodying the general principles of this invention would of course be built to meet the operational conditions under which it is to be put into service and therefore might take on quite a variety of structural forms. The cylindrical tank shown has proved to be the least expensive form of container to provide a given capacity and it is structurally very strong due to its circular cross section.

Tank 10 is provided with a filling opening 12 which is closed by a suitable cover as 14. A discharge spout is provided at 16 and a man-hole opening, useful in cleaning out and repairing the air distributing means of the container is shown at 18.

Figure 2:
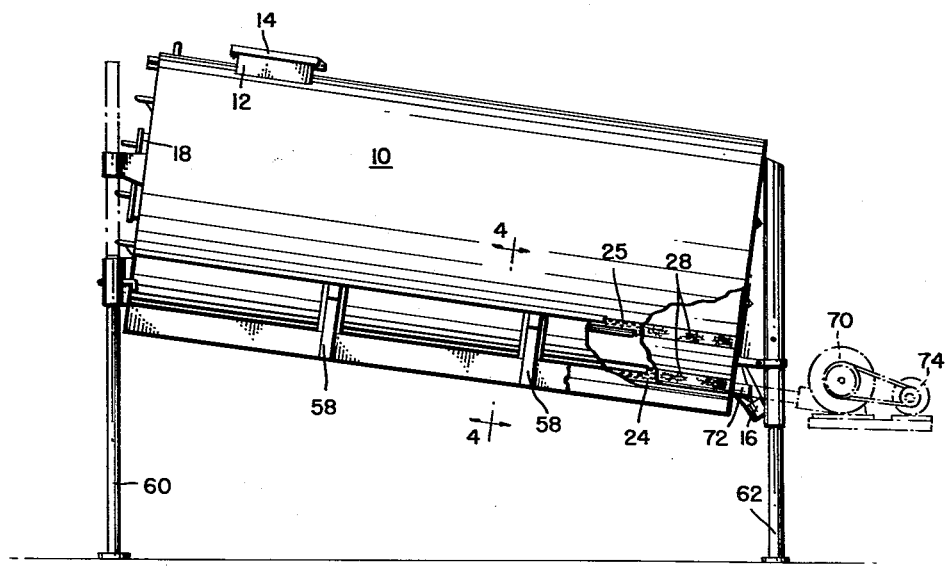
Figure 2 is a side elevation of a container in position for use which is partly broken away and sectioned to illustrate the plenum chamber and the framing employed to support the container and relieve the container itself from strain or shock loading.

In order to overcome many of the difficulties of handling bulk powdered materials, particularly flour of a type made from grains, it is very desirable to employ the rather well known principle of air flotation of the flour so that it can be caused to flow, under the urgence of gravity, out the discharge opening or spout 16. Considerable difficulty has been experienced in the past, however, with air flotation for flour and like very finely divided materials, and the form, probably best shown in Figures 2 and 3 has been found to be a very satisfactory solution of this problem. In this arrangement there is provided a plenum chamber 20 which serves as a pressure equalizing chamber and distributor for air under moderate pressures (above atmospheric) and this further provides definitely for distributing the air following a definite plan that has been found to produce the best flow in flours and like materials.

The air distribution plan provides that the central portion of the container, throughout its length and for one-eighth of its periphery centered on the bottom center line will be provided with an open portion at 22 which is provided with a perforated closure plate 24. Air passes from the plenum chamber 20, up through the perforations as 26 into the mass of flour lying above the plate. It has been found, however, that the air streams entering the flour mass must be very finely divided, otherwise there will be a marked tendency to blow channels through the flour and this, of course, prevents the establishment of air flotation, which is essential for the final operation of this equipment as will be explained later.

It is, therefore, desirable that fabric membranes of a porous character, be provided at 28 so as to overlie the perforations; and, as a means of securing the same in place against the air pressure blowing through it, the ends are turned under plates 24, 25 and 27 on all their margins and are clamped in this arrangement by the clamp bolts 30 which also hold the perforated plates clamped in position but these are still removable when occasion demands. The fabric membrane used, must of course be pervious to air, and should have a fineness in proportion to the fineness of material which is to be transported and stored in the container.

In addition to being marginally clamped, the pervious membrane is preferably glued to the perforated plates 24, 25 and 27. The membrane may be made of such fabrics as flax cloth or synthetics such as "nylon" or "Dacron." The woven materials should be chosen to suit the powdered materials transported and for flour this range of pass-through opening sizes is .0076", .0053" and .0037". The size of opening in the perforated closure plates should likewise be balanced against the depth of material being transported. Flour for instance normally weighs from 30 to 40 pounds per cubic foot and therefore the weight of flour carried by the unsupported fabric, spanning the openings, must be kept well within the strength of the fabric. For these reasons gluing the fabric to perforated steel plates localizes the strains and is much more desirable than using a wire screen support for the fabric. The membranes also permit using relatively large perforations 26.

The air passing through each of the perforated plates as 24, 25 and 27 is supplied in amounts in proportions to their areas and is controlled by the number and size of the lateral air ports or limbers 34, 36 and a plurality of central ports shown at 38. Suitably positioned air openings are provided in the transverse frames 45 and openings 47 in the longitudinal frame members 44 and 46 to insure proper distribution of the air being forced into the plenum chambers.

The plenum chamber 20 is formed preferably by having two concentrically positioned plates 40 which are spaced from shell 42 of tank 10 by a plurality of longitudinal structural members as 44, 46 and 48 and transverse structural members as 45. It is essential that the enclosing plates 40 provide adequate strength to carry the very substantial loading placed in a container of the generous proportions that must be used with this equipment if it is going to be commercially acceptable.

Adapted to support plates 40 is a framework consisting of the longitudinal structural members 50 and 52 which are connected by plate 54 and the additional plates which act as stiffeners at 56 and 58. These members are normally welded together so as to give a rigid supporting frame that will make it possible for the frame of a truck, for instance, to accept the weight from the two structural members 50 and 52; and further these members must be sufficiently strong so that the entire container can be set down on a floor resting only on these points. This framework also supplies the strength required for the four support units as 60, 61, 62 and 63. These members can take on any acceptable form and must, of course be quite securely anchored to the container itself, as it is desirable to have these four members extendable so that they can take the entire weight of the container, with its load, and support it after it is raised off the transporting truck which may then be driven out from under the same leaving the container in position where it can supply the processor's need until the supply is exhausted.

Air under pressure of from 1½ to 4 pounds per square inch above atmospheric pressure may be supplied to the plenum chamber 20 by any suitable means. If the container is going to be used at a plant for extended storage periods, the air could no doubt be supplied by some of the fixed equipment of the processing plan. However, it appears most convenient to supply an impeller type compressor 70 which is suitably joined, as by duct 72, to the plenum chamber. To drive this unit a suitable electric motor as 74 may be provided and be supplied with power from local power sources. On the other hand, if the unit is going to transport and deliver powdered materials for use in fields or other points remote from electric power sources a conventional type of internal combustion engine might be used. Engines of this order are normally single cylinder air-cooled units that are very commonly used for such work.

To meet certain conditions it may be desirable to use the aerating air for conveying the material to a distance. For such uses the closures 18 and 14 should be provided with sealing means to retain air pressures of from 10 to 15 p.s.i. The filling opening 12 to be closed after the container is filled with flour or the like. After the flour has been aerated by air supply means capable of maintaining air pressures in the range indicated, the discharge 16 may be used to control the flow of flour from the container.

One satisfactory means for lifting the container to a height where it will clear the truck body or frame is to employ two forward jacks 80 and two rear jacks 82 preferably of the hydraulic operated type. The jacks are secured to the truck and when they have raised the container to a satisfactory height, the support members 60, 61, 62 and 63 are secured in adjusted position and the jacks are slacked off to transfer the container and its load from the truck to the support members. The truck can then be driven away. To pick up the containers would be a mere reversal of the detailed operations.

*Method of operation*

In a preferred use for this equipment, in order to expedite the handling of bulk flours and the like (and at the same time do it in a manner to effect a very appreciable saving in the delivery cost of the goods) the container normally will be unloaded on some form of ramp, so that the flour, as it is produced by the manufacturer, can be led directly to the container and introduced through the filling opening 12 until the container has a capacity load or at least as much as the processor desires.

Transportation would be effected by having the truck back under the unit, which would either be suspended at the plant or be supported on its legs as 60, 61, 62 and 63, in which case the jacks 80 and 82 of the truck would be used to first take the load off the legs, so their securing means could be released and then to lower the container onto the truck. With the container secured to the truck, in transportable arrangement, the unit is moved to the point where the flour or finely divided materials is desired possibly for further processing, and at that point the container would be unloaded, preferably, by means of its own supporting members and the truck jacks. However, as the unit is put in place at the delivery point it should be inclined from six degrees to eight degrees which will vary somewhat with the materials used—with wheat flour, for instance eight degrees is quite satisfactory. Air under approximately three pounds per square inch pressure is then fed by compressor 70 through the plenum chamber, out through the perforated plates, through the fabric material and into and largely under the flour. The introduced air being under pressure tends to rise and fill the interstices between the tiny particles of the material until, when an adequate amount of air has been supplied the mass becomes fluid and loses all tendency to bridge over. As soon as this fluid condition is built up gravity begins to act and the materials will flow if given a small downward slope.

It is believed that it will be clearly apparent from the above description and the disclosure in the drawings that the invention comprehends a novel construction of a dispensing container for powdered materials.

Having thus disclosed the invention, I claim:

1. A transportable bulk container for powdered materials, comprising: a tank of cylindrical form normally employed in a substantially horizontal position; a filling opening in the upper portion of said tank and means to close said filling opening; a discharge opening in the lowermost portion of said tank and means to close said discharge opening; a supporting framework secured to the bottom of said tank and so proportioned as to facilitate securing said tank to a truck for transporting it and for supporting the tank at a point of use; a plenum chamber disposed below said tank and extending throughout its length; said plenum chamber composed of plates spaced apart from the bottom of said tank by spacing and positioning members disposed longitudinally and transversely of said tank to provide a central plenum portion and lateral plenum portions spaced away from and parallel to said central portion; removable perforated plates for each of said plenum portions having openings for conducting air from the plenum chambers to the interior of said tank; fabric membranes of a porous character having a pass through opening size in the range of .0027" to .0076", adhesively secured to the upper faces of said perforated plates; limber holes in said longitudinal and transverse spacing members to proportion incoming air to the central plenum chamber portion and the lateral plenum chamber portions; and means for supplying air under pressure to said plenum chamber.

2. A transportable bulk container for powdered materials, comprising: a tank of cylindrical form normally employed in a substantially horizontal position; a filling opening in the upper portion of said tank and means to close said filling opening; a discharge opening in the lowermost portion of said tank and means to close said discharge opening; means secured to the bottom of said tank to facilitate securing said tank to a truck for transporting it; means adapted to raise or lower the tank and to incline the same; a plenum chamber disposed below said tank and extending throughout its length; said plenum chamber composed of plates spaced apart from the bottom of said tank by spacing and positioning members disposed to provide a central plenum portion and lateral plenum portions spaced away from and parallel to said central portion; perforated and removable cover plates for each of said plenum portions having openings for conducting air from the plenum chambers to the interior of said tank; fabric membranes, of a porous character having a pass through opening size in the range of .0027" to .0076", adhesively secured to one face of each of said perforated plates; limber holes in said spacing and positioning members to proportion incoming air to the central plenum chamber portion and the lateral plenum chamber portions; and means for supplying air under pressure to said plenum chamber.

3. A transportable bulk storage container for powdered materials comprising: a tank of cylindrical form normally employed in a substantially horizontal position; a filling opening in the upper portion of said tank and means to close said filling opening; a discharge opening in the lowermost portion of said tank and means to close said discharge opening; units secured to said tank a plenum chamber disposed below said tank and extending throughout its length; said plenum chamber composed of plates spaced apart from the bottom of said tank by spacing and positioning members disposed to provide a central plenum portion and lateral plenum portions spaced away from and parallel to said central portion; removable perforated plates for each of said plenum portions having openings for conducting air from the plenum chambers to the interior of said tank; fabric membranes of a porous character having a pass through opening size in the range of .0027" to .0076" adhesively secured to the upper faces of said perforated plates; limber holes in said spacing and positioning members to proportion incoming air to the central plenum chamber portion and to the lateral plenum chamber portions; and means for supplying air under pressure to said plenum chamber.

4. A transportable bulk container for powdered materials, comprising: an enclosed, cylindrical container having separate filling and discharge openings and closures for the same and adapted to be transported and stored in a horizontal position; a centrally disposed, open bottom portion of said container extending throughout the length and around substantially one-eighth of the periphery thereof; a perforated closure plate for said open bottom portion and means for removably clamping it in place; additional lateral openings in said container disposed parallel to said open bottom portion, one on each side of the same and positioned on the curved sides of said container and spaced from said open bottom portion by a distance equal substantially to one-half the width of each bottom portion; said lateral openings having a combined width of less than half of said open bottom portion; perforated closure plates for said lateral openings and means for removably clamping the plates in place; fabric covers for said closure plates to act as air distributors, and the margins turned under said plates so the plate clamping means secure them in place; a plenum chamber under said perforated plates to distribute compressed air to each of said openings; means for supplying air under moderate pressure to said plenum chamber; a supporting framework for said container providing two straight lines of support means disposed with their bearing surfaces parallel to the bottom of said container and said lines of support spaced substantially the width of a transportation truck frame; means for raising said container off a transport unit and optionally supporting it in a position sloping downwardly to the discharge opening; said plenum chamber being made of concentrically disposed metal plates spaced apart by metal structural members disposed parallel to the longitudinal axis of said container and metal structural members disposed transversely of said longitudinal axis and a plurality of ports in said longitudinally and said transversely disposed structural members adapted to conduct and distribute the compressed air to the various portions of the central and lateral perforated closure plates to effect a uniform distribution of air to produce air flotation of said powdered materials.

References Cited in the file of this patent

UNITED STATES PATENTS

| | | |
|---|---|---|
| 2,545,766 | Cline | Mar. 20, 1951 |
| 2,694,496 | Atkinson | Nov. 16, 1954 |
| 2,735,725 | Galle | Feb. 21, 1956 |
| 2,812,873 | Coleman | Nov. 12, 1957 |

FOREIGN PATENTS

| | | |
|---|---|---|
| 307,150 | Switzerland | July 16, 1955 |